US006831716B2

(12) United States Patent
Dozov et al.

(10) Patent No.: US 6,831,716 B2
(45) Date of Patent: Dec. 14, 2004

(54) REFLECTIVE BISTABLE DISPLAY DEVICE INCORPORATING A LIQUID CRYSTAL MATERIAL

(75) Inventors: Ivan N. Dozov, Gir Sur Yvette (FR); Philippe R. Martinot-Lagarde, Marcousis (FR); Daniel N. Stoenescu, Orsay (FR)

(73) Assignee: NEMOPTIC, Magny-Les-Hameaux (FR)

( * ) Notice: Subject to any disclaimer, the term of this patent is extended or adjusted under 35 U.S.C. 154(b) by 0 days.

(21) Appl. No.: 10/276,103

(22) PCT Filed: May 11, 2001

(86) PCT No.: PCT/FR01/01428

§ 371 (c)(1),
(2), (4) Date: Nov. 12, 2002

(87) PCT Pub. No.: WO01/86618

PCT Pub. Date: Nov. 15, 2001

(65) Prior Publication Data

US 2003/0174266 A1 Sep. 18, 2003

(30) Foreign Application Priority Data

May 12, 2000 (FR) .............................................. 00 06107

(51) Int. Cl.[7] ...................... G02F 1/1335; G02F 1/133; C09K 19/52
(52) U.S. Cl. ........................... 349/113; 349/33; 349/96; 349/117; 349/123; 349/177
(58) Field of Search ............................... 349/33, 96, 99, 349/112, 113, 117, 120, 177

(56) References Cited

U.S. PATENT DOCUMENTS 4,333,708 A * 6/1982 Boyd et al. .................. 349/129
5,357,358 A * 10/1994 Durand et al. ............... 349/125
5,796,459 A * 8/1998 Bryan-Brown et al. ...... 349/132
5,831,700 A 11/1998 Li et al.
5,995,173 A 11/1999 Barberi et al.
6,327,017 B2 * 12/2001 Barberi et al. ............... 349/177
6,469,768 B1 * 10/2002 Lee ............................. 349/177
6,734,936 B1 * 5/2004 Schadt et al. ................ 349/117

FOREIGN PATENT DOCUMENTS

| FR | 2740894 | 5/1997 |
| JP | 11344730 | 12/1999 |
| WO | WO 99/10870 | 3/1999 |
| WO | WO 99/34251 | 7/1999 |

OTHER PUBLICATIONS

Jpn. J. Appl. Phys. vol. 37, No. 5A, May 1998, "Reflective Bistable Twisted Nematic Liquid Crystal Display", Z. Xie, et al., p. 2572–2575.

* cited by examiner

*Primary Examiner*—Tarifur R. Chowdhury
(74) *Attorney, Agent, or Firm*—Blakely Sokoloff Taylor & Zafman

(57) ABSTRACT

The present invention relates to a reflective liquid crystal display device comprising a liquid crystal material (30) contained between two parallel substrates (20, 40) provided with aligning means on the electrodes to orient the liquid crystal and enable at least two alternative distinct textures that are stable or metastable in the absence of a field to be obtained, means for applying electrical signals to the liquid crystal to perform switching by enabling anchoring on at least one of the two substrates to be broken, a polarizer (10) associated with the front face of the device and oriented at an angle lying in the range 15° to 75° relative to the director of the liquid crystal on the front face of the device, and a specular or diffusing reflective element (50) placed at the rear face of the liquid crystal.

18 Claims, 16 Drawing Sheets

Twist state $\Delta\Phi_0 + \pi$

Twist state $\Delta\Phi_0 - \pi$

REFLECTIVE BISTABLE DISPLAY DEVICE INCORPORATING A LIQUID CRYSTAL MATERIAL

The present application is a non-provisional application of International Application No. PCT/FR01/01428, filed May 11, 2001.

The present invention relates to the field of liquid crystal display devices.

STATE OF THE ART

Depending on the physical nature of the liquid crystal used, distinctions are drawn between devices in which the liquid crystals are nematic, cholesteric, smectic, ferrolectric, etc. In nematic displays, which constitute the preferred application of the present invention, a nematic liquid crystal is used that is non-chiral or that is made to be chiral, e.g. by adding a chiral dopant. This produces a texture which is spontaneously uniform or lightly twisted, with a helical pitch that is greater than a few micrometers. The orientation and the anchoring of the liquid crystal close to surfaces are defined by alignment layers or treatments that are applied to the substrates.

Most devices that have been proposed or made in the past are monostable. In the absence of an electric field, only one texture is obtained in the device. This texture corresponds to an absolute minimum in the total energy of the cell. Under an electric field, the texture is deformed continuously and its optical properties vary as a function of the applied voltage. When the field is interrupted, the nematic crystal returns to its single monostable texture. The person skilled in the art will recognize that these systems include the modes of operation that are in the most widespread use in nematic displays: twisted nematic (TN), supertwisted nematic (STN), electrically controlled birefringence (ECB), vertically aligned nematics (VAN), etc.

Another class of nematic displays is that of nematics that are bistable, multistable, or metastable. Under such circumstances, at least two distinct textures that are stable or metastable in the absence of a field can be achieved in a cell, using the same anchoring on the surfaces. The terms "bistable" or "multistable" are generally used to designate at least two states having the same energy or energy which is very similar, and which are likely to endure almost indefinitely in the absence of any external command. In contrast, the term "metastable" is used for states having different energy levels which are likely to switch after a relaxation time that is long. Switching between two states is achieved by applying appropriate electrical signals. Once a state has been written, it remains stored in the absence of an applied field because the crystal is bistable. This memory of bistable displays is very attractive in numerous applications. Firstly, it enables images to be refreshed at a slow rate, which is most advantageous for reducing energy consumption in portable appliances. Secondly, in fast applications (e.g. video), the memory makes a very high multiplexing rate possible, thus enabling high resolution video to be displayed.

Recently, a new bistable display [document 1] has been proposed, using a liquid crystal that is cholesteric or chiralized nematic. The two bistable textures, U (for uniform or lightly twisted) and T differ from each other by twisting through ±180° and they are topologically incompatible (FIG. 1). The spontaneous pitch $p_0$ of the nematic is selected to be close to four times the thickness d of the cell ($p_0 \approx 4d$) so that the U and T energies are substantially equal. Without an applied field, there exists no other state of lower energy: U and T are genuinely bistable.

Because of the topological incompatibility of the two bistable textures, it is not possible to transform one into the other without continuous bulk distortion. Switching between U and T thus requires a strong external field to induce anchoring transitions on the surfaces. Above a threshold electric field $E_c$ (threshold for breaking anchoring), an almost homeotropic texture (referenced H in FIG. 1) is obtained, with anchoring on at least one of the substrates being broken: the molecules extend normally to the plate in the vicinity of said surface.

When the field is interrupted, the nematic molecules close to the broken surface are in unstable equilibrium, without any anchoring torque, and they can return either to their initial orientation (thus returning to the same texture as they had prior to the field being applied), or else they can turn through 180° and, after relaxation, give rise to a bulk texture with an additional twist through 180°. At the end of the command pulse, the cell is guided in selecting one or other of its bistable states depending on whether the coupling between movements of molecules close to the two surfaces is elastic or hydrodynamic: elastic coupling causes a return to the U state, hydrodynamic coupling towards the T state.

For the information displayed on the device to appear, it is necessary for the textures that are achieved to have optical properties that are different. Most devices operate in polarized light and use additional optical components: polarizers, filters, compensating plates, etc. These elements and their orientations relative to anchoring on the two surfaces are selected as a function of the configuration of the display in order to optimize the relevant optical performance: contrast, brightness, color, viewing angle, etc.

For monostable displays, optimization needs to apply to an entire continuum of states achieved under fields of greater or lesser strengths because these states are on display throughout the duration of an image. A very large number of optical configurations have been proposed and made for a variety of devices (TN, STN, etc.), taking account of the particular features of each of those displays.

The optics of a bistable display in which anchoring is broken are very different from those of monostable devices. Firstly, throughout the major fraction of the duration of an image, only two textures are present in each cell of the display: those that correspond to the two bistable states. The optimum configuration must enable maximum contrast to be achieved between those two textures, while minimizing transient optical effects during switching due to passing rapidly through intermediate states under a field. Furthermore, the main difference between the two bistable textures, an additional twist of 180°, is not a parameter that is available for optimization: it is imposed by the physical mechanism used for achieving two bistable states. In addition, bistable switching requires an electric field that is strong $E > E_c$ (close to 10 volts per micrometer (V/µm)) and thus a control voltage $U = E \cdot d$ that is proportional to the thickness d of the cell. The liquid crystal layer must therefore be very fine (d≈2 µm to 3 µm) in order to make it possible to achieve control with voltages that are reasonable, and so optical optimization must take these requirements into account.

SUMMARY OF THE INVENTION

An object of the present invention is now to propose a novel display device based on liquid crystals which present properties that are better than those of previously known devices.

In the context of the present invention, this object is achieved by a reflective bistable device and characterized by the fact that it comprises:

a) a liquid crystal material contained between two parallel substrates, the substrates being provided with electrodes on their facing inside surfaces in order to enable an electric field to be applied to said liquid crystal, at least the front substrate and the front electrode being optically transparent;

b) alignment layers or treatments on the electrodes to orient the liquid crystal and enable at least two alternative distinct textures that are stable or metastable in the absence of a field to be implemented, in which one of the textures is either non-twisted or twisted with a total angle lying in the range −90° to +90°, and the other texture presents additional twisting through an angle close to 180°;

c) the thickness d of the liquid crystal layer being selected in such a manner that the product d·Δn is close to $\lambda_0/4$, where $\lambda_0$ is the center wavelength of the working spectrum band of the display and Δn is the birefringence of the liquid crystal for said wavelength;

d) means for applying electrical signals to the liquid crystal enabling it to switch between said distinct textures by breaking anchoring on at least one of the two substrates, and enabling the crystal to remain in either texture after the field has been removed;

e) a polarizer associated with the front face of the device, placed inside or outside it, and oriented at an angle lying in the range 15° to 75° relative to the director of the liquid crystal on the front face of the device; and f) a specular or diffusing reflective element placed at the rear face of the liquid crystal, inside or outside the device, enabling light to pass twice through the device and return towards an observer or towards additional optical elements.

The reflective bistable display thus proposed by the present invention offers numerous advantages.

In particular it can keep and display an image for a very long time without consuming energy, neither to make it operate (because it is bistable), nor to light it (it does not need an internal light source).

This reflection bistable device can be optimized by taking account of various parameters. With a single polarizer, it makes several configurations possible, giving contrast of 50 to 60 in white light. Without losing optical quality, optimization also makes it possible to use minimum cell thickness, thus making switching much faster and reducing the control voltages needed for switching purposes.

According to other characteristics of the invention:

the liquid crystal material comprises a liquid crystal or a liquid crystal mixture in a nematic phase;

the liquid crystal material comprises a liquid crystal or a liquid crystal mixture in a cholesteric or nematic phase doped with a chiral substance in order to enable the energies of certain textures amongst the stable or metastable textures to be brought closer together or be equalized;

the optical delay d·Δn of the liquid crystal lies in the range $0.15\lambda_0$ to $0.35\lambda_0$, preferably in the range $0.20\lambda_0$ to $0.32\lambda_0$, where $\lambda_0$ is the center wavelength of the working spectrum band;

the polarizer is a linear polarizer or an elliptical polarizer;

a compensating plate is introduced on the optical path between the polarizer and the reflector inside or outside the device, providing an optical delay ΔI less than $\lambda_0/12$ where $\lambda_0$ is the center wavelength of the working spectrum band;

at least one of the electrodes contains a plurality of different segments enabling a plurality of independent pixels to be made on the same substrate and in the same device;

the independent pixels are provided with independent means for applying the field;

the independent pixels are organized in a multiplexed passive matrix;

the independent pixels are organized in a multiplexed active matrix;

the polarizer is oriented at an angle close to 45° relative to the director of the liquid crystal on the front face of the device;

the twist angle of the first texture is practically zero (Δφ≈0);

the twist angle of the texture in the low twist state, the relative twist between the two states, the orientation of the polarizer relative to the alignment of the liquid crystal on the front face, the thickness of the liquid crystal material placed between the two substrates, and the birefringence of the liquid crystal are optimized so as to obtain optimum optical performance, in particular in terms of contrast, brightness, and color;

the optical axis of the compensating plate is oriented at substantially 45° relative to the polarizer;

the liquid crystal introduces an optical delay lying in the range 100 nanometers (nm) to 180 nm;

the compensating plate introduced an optical delay of less than 50 nm;

the polarizer is combined with the compensating plate in the form of a single element so as to constitute an electrical polarizer; and the thickness of the liquid crystal material is less than 6 μm.

BRIEF DESCRIPTION OF THE DRAWINGS

Other characteristics, objects, and advantages of the present invention appear on reading the following detailed description and from the accompanying drawings given as non-limiting examples, in which.

DETAILED DESCRIPTION OF THE INVENTION

Like other reflective displays, bistable devices can be made in numerous configurations, having one or two polarizers, one or more compensating plates, etc. In the present invention, the device has a single polarizer placed on the path of the light, at the front face of the device. This configuration has the major advantage of providing maximum brightness because it minimizes losses of light due to any second polarizer.

Figure 1:
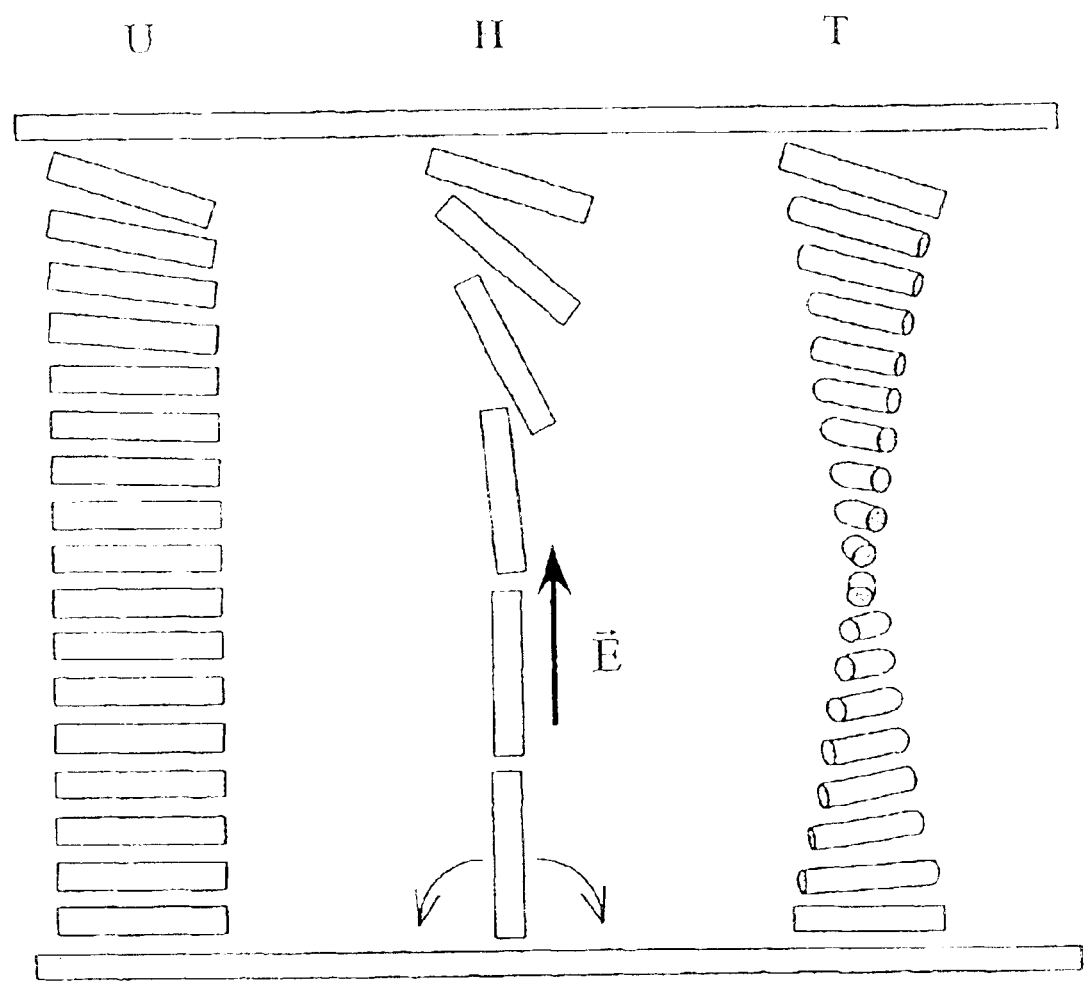
FIG. 1, described above, is a diagram showing the three states that are to be obtained with a display in accordance with the state of the art.
Figure 2:
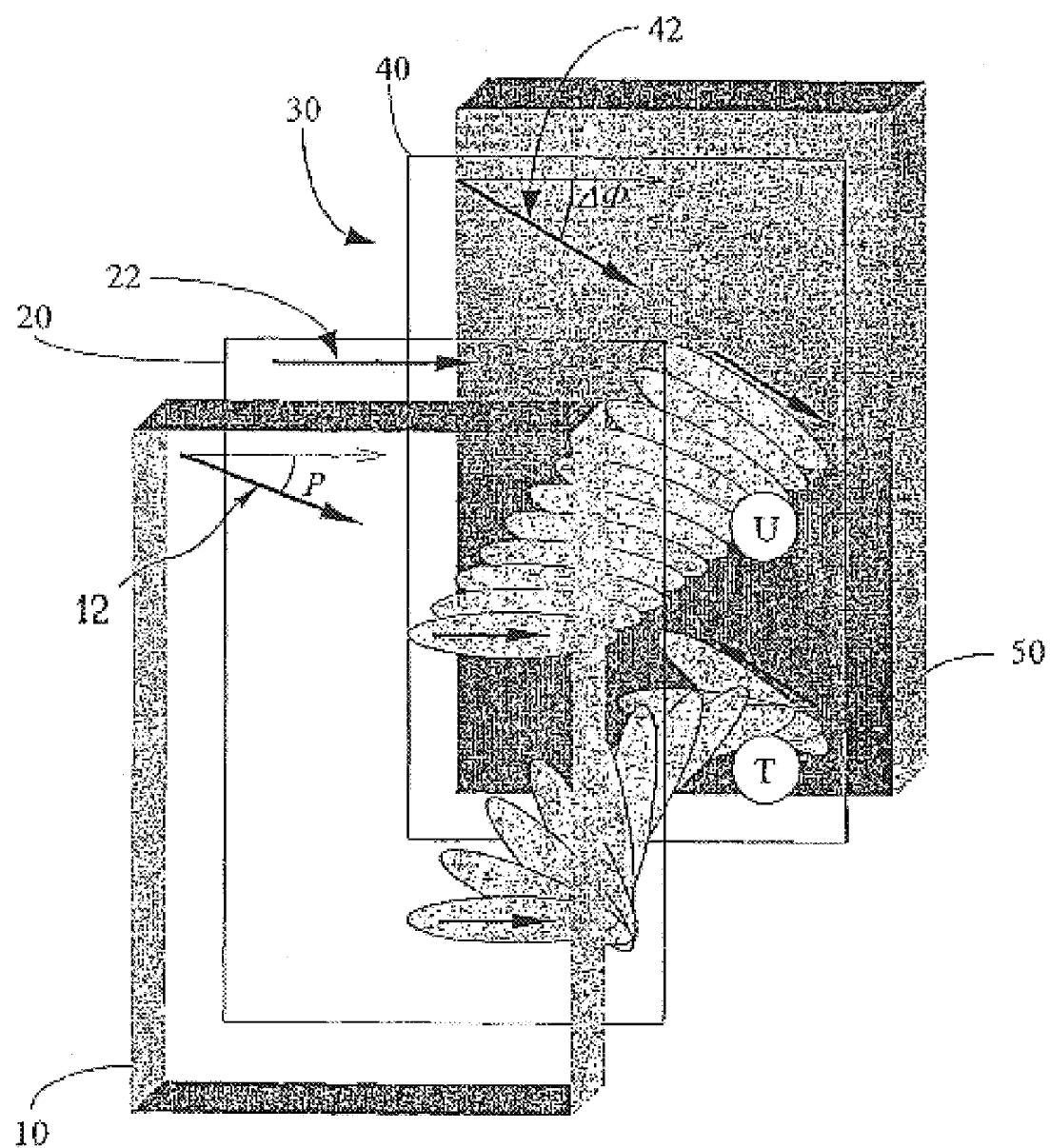
FIG. 2 is a diagrammatic perspective view of a device in accordance with the present invention.

The simplest configuration of a device in accordance with the present invention, as shown in FIG. 2, comprises merely a polarizer 10 at the front face and a mirror 50 at the rear face of the liquid crystal layer 30 which is placed between two substrates 20 and 40 provided with electrodes on their inside surfaces, and with no additional optical element (for example no compensating plate).

In FIG. 2, the orientation of the polarizer 10 is referenced 12, the alignment directions defined respectively on each of the two substrates 20 and 40 are referenced 22 and 42 (giving a twist angle $\Delta\phi$), and the two states U and T that can be taken up by the liquid crystal material 30 are represented diagrammatically.

To optimize the device in accordance with the present invention, it is possible to vary all of the parameters defining the optical properties of the display: the twist angle $\Delta\phi_0$ of the texture in the low twist state U ($|\Delta\phi_0| \leq 180°$), the additional $\pm 180°$ twist in the second bistable state T, the orientation P of the polarizer 10 relative to the alignment of the liquid crystal 30 on the front face 20 ($-90° \leq P \leq 90°$), the thickness $\underline{d}$ of the liquid crystal material 30 placed between the two substrates 20 and 40, and the birefringence $\Delta n$ of the liquid crystal.

These parameters are selected so as to obtain optimum optical performance for the device, and in particular optimum contrast, brightness, color, etc.

A particular feature of bistable displays is the fact that most of the time only two states are required and therefore it is only these two states that need to be optimized optically.

It is shown that in general, for arbitrary orientation P of the polarizer 10, a plurality of solutions give optical performance that is optimal. Selecting between these solutions makes it possible, without losing optical quality, to optimize switching of the liquid crystal, for example by reducing the thickness $\underline{d}$ of the layer 30.

Bistable devices require a very strong electric field E to be applied, having a value close to 10 V/μm, which value is imposed by the usual very high thresholds for breaking anchoring. The control voltages U=d·E are therefore very large compared with conventional displays. A reduction in thickness enables U to be reduced by a corresponding factor.

The optical relaxation time after switching is proportional to $d^2$, and that also encourages using small values for $\underline{d}$, which is very important in high speed applications, e.g. when displaying video.

Finally, the bistable nematics are switched under the control of hydrodynamic shear flows, launched at the end of the control pulse, and by weak elastic coupling between two surface anchorings. A thin liquid crystal reinforces hydrodynamic and elastic coupling and therefore favors more effective control of the display.

The person skilled in the art will understand the importance of the optimum configuration presented in the context of this invention, making it possible simultaneously to improve optical quality, speed, control voltage, and switching of the device between the two bistable states.

Figure 3:
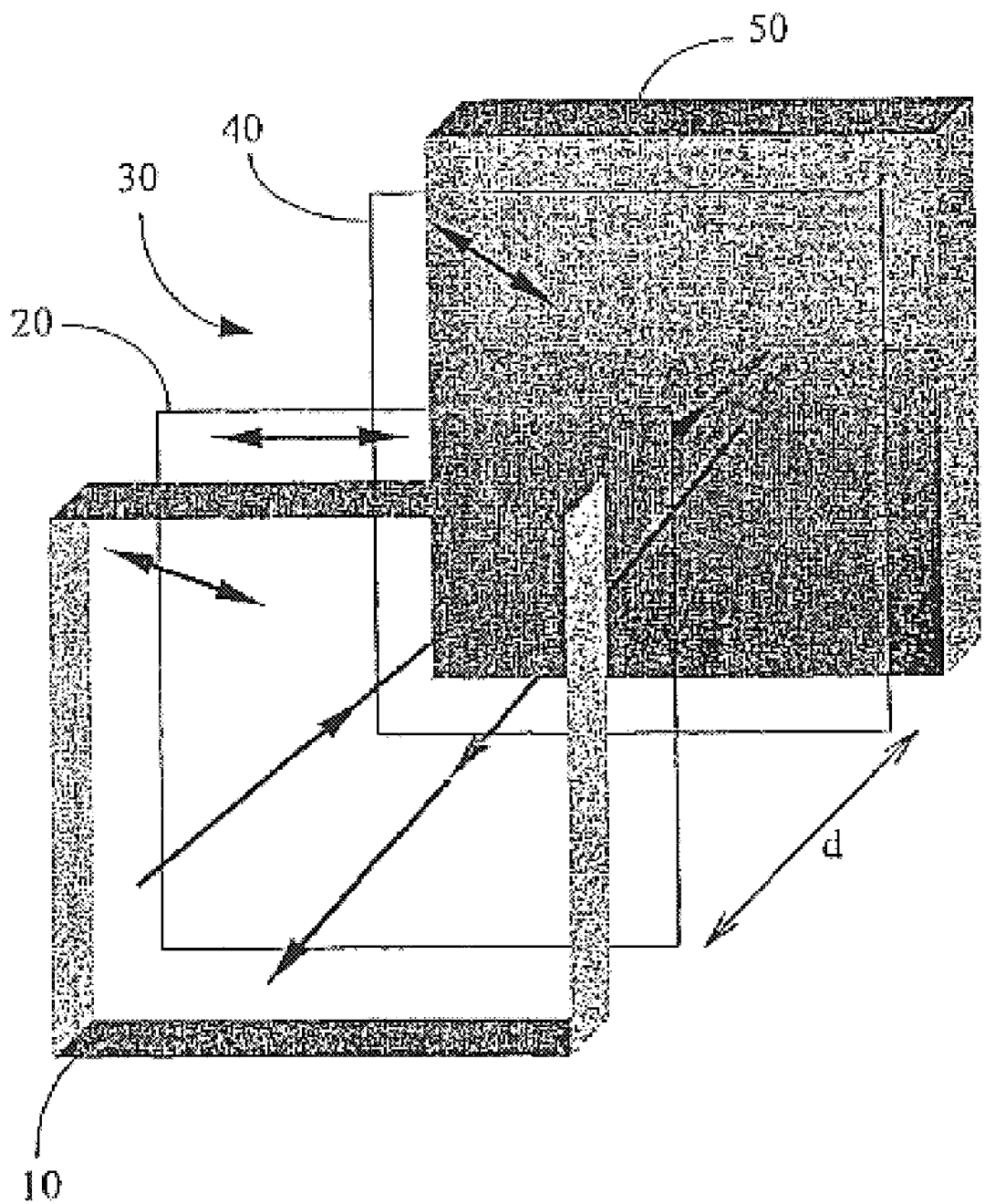
FIG. 3 is a diagram showing the go-and-return paths of light through the device in accordance with the present invention as made possible by the reflector.

For a uniformly twisted texture, in which the helical pitch is considerably greater than the wavelength of the light, and when light is propagating parallel to the axis of the helix, there exist well-known analytic formulae [document 2] which describe the optical properties of the system to within a good approximation. Taking account of the fact that light passes both ways through the device (as shown in FIG. 3), and assuming that the polarizer 10 and the mirror 50 are perfect, we obtain the following formulae for the reflectivity of the display:

$$R = 1 - \cos^2(\epsilon)\cos^2(2P - \alpha) \qquad (1)$$

where $$\sin\left(\frac{\epsilon}{2}\right) = \frac{\pi\xi}{\sqrt{\Delta\phi^2 + \pi^2\xi^2}} \sin\left(\sqrt{\Delta\phi^2 + \pi^2\xi^2}\right) \qquad (2.a)$$

$$\tan\left(\frac{\epsilon}{2}\right) = \frac{\pi\xi}{\sqrt{\Delta\phi^2 + \pi^2\xi^2}} \tan\left(\sqrt{\Delta\phi^2 + \pi^2\xi^2}\right) \qquad (2.b)$$

$$\xi = \frac{d \cdot \Delta n}{\lambda} \qquad (2.c)$$

where $\epsilon$ and $\alpha$ are functions of the integrated birefringence of the liquid crystal d·Δn, of the wavelength of the light λ, of the angle of the twisted state $\Delta\phi$, and of the orientation of the polarizer P.

Figure 4:
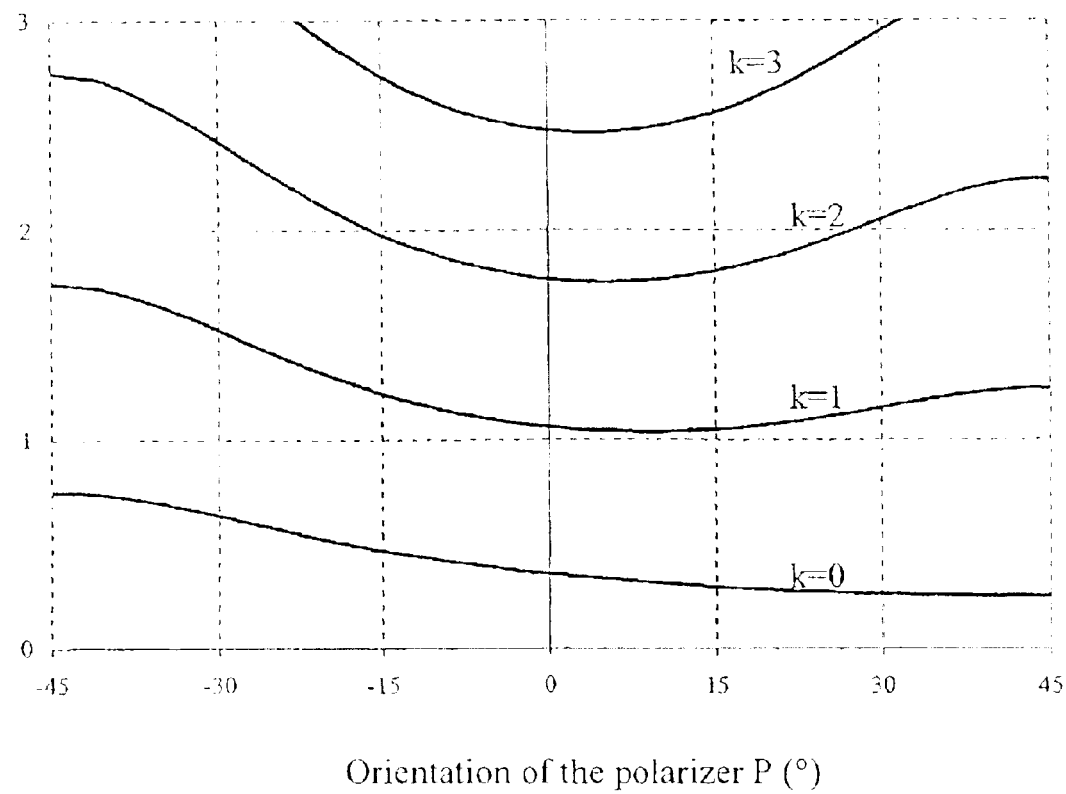
FIGS. 4 and 5 are graphs showing various solutions for equations as a function of the orientation of the polarizer, as explained below.
Figure 5:
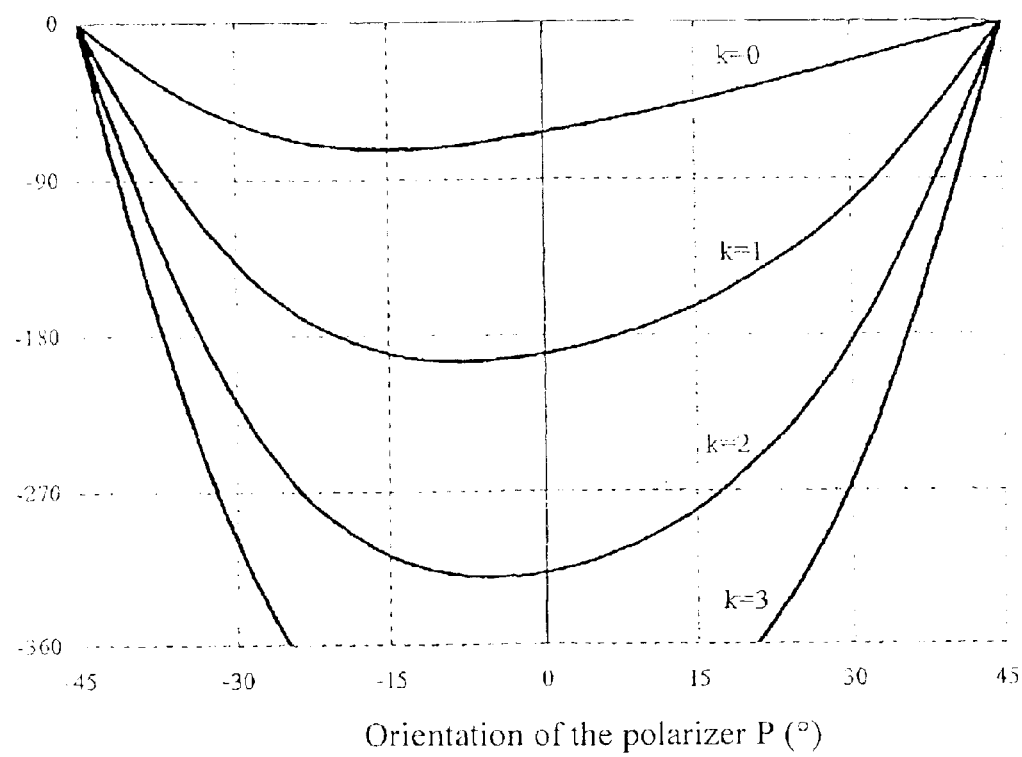

To optimize monochromatic light contrast, it is necessary for one of the bistable states of twist $\Delta\phi$ or $\Delta\phi \pm \pi$ to be black (R=0). For each orientation of the polarizer 10, equation (1) gives a series of solutions ($\xi_k$, $\Delta\phi_k$) which satisfy this condition (FIGS. 4 and 5). The first branches (k=0,1,2, or 3) of the solutions $\xi_k(P)$ and $\Delta\phi_k(P)$ are given in FIGS. 4 and 5 where for reasons of consistency the figures are limited to the polarizer 10 having orientations in the range $-45° \leq P \leq +45°$ and to cell twist of $\Delta\phi<0$. Solutions with $\Delta\phi>0$ correspond to $45° \leq P \leq 135°$ and can be obtained from the same figure by means of the following transformation:

$$\begin{cases} \xi_k(90° - P) = \xi_k(P) \\ \Delta\phi_k(90° - P) = \Delta\phi_k(P) \end{cases} \qquad (3)$$

All of these solutions correspond to infinite contrast in monochromatic light with $\lambda_0 = d \cdot \Delta n / \xi_k$. In practice, the display is required to provide contrast that is also good in white light, i.e. when λ varies around $\lambda_k$ (for fixed P and $\Delta\phi$), R must remain close to zero.

Figure 6:
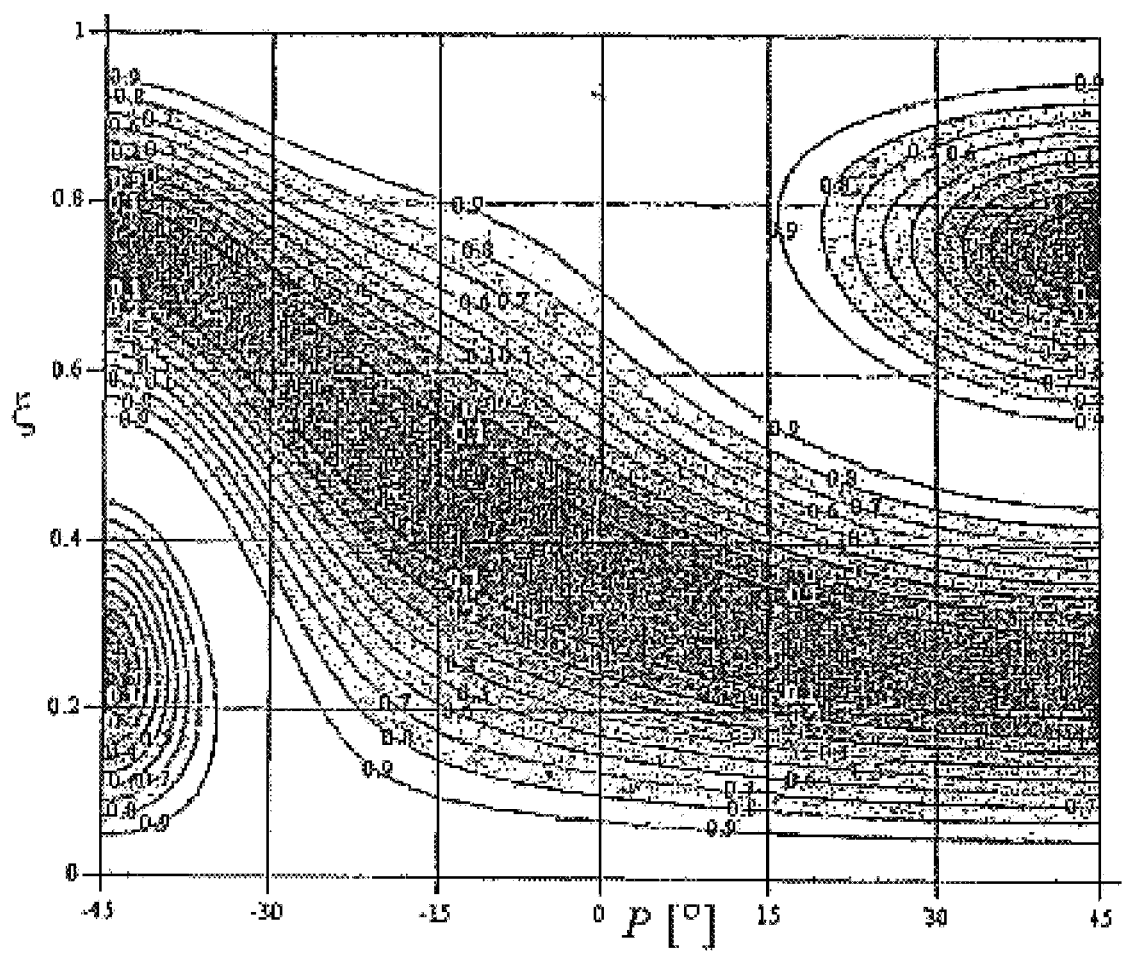
FIG. 6 shows a particular branch of one solution in accordance with the present invention that gives good contrast in white light.

The first branch ($\xi_0, \Delta\phi_0$) shown in FIG. 6 satisfies this criterion best and corresponds to white light contrast that is much better than that of the other branches. It is only this solution that is considered below.

Figure 7:
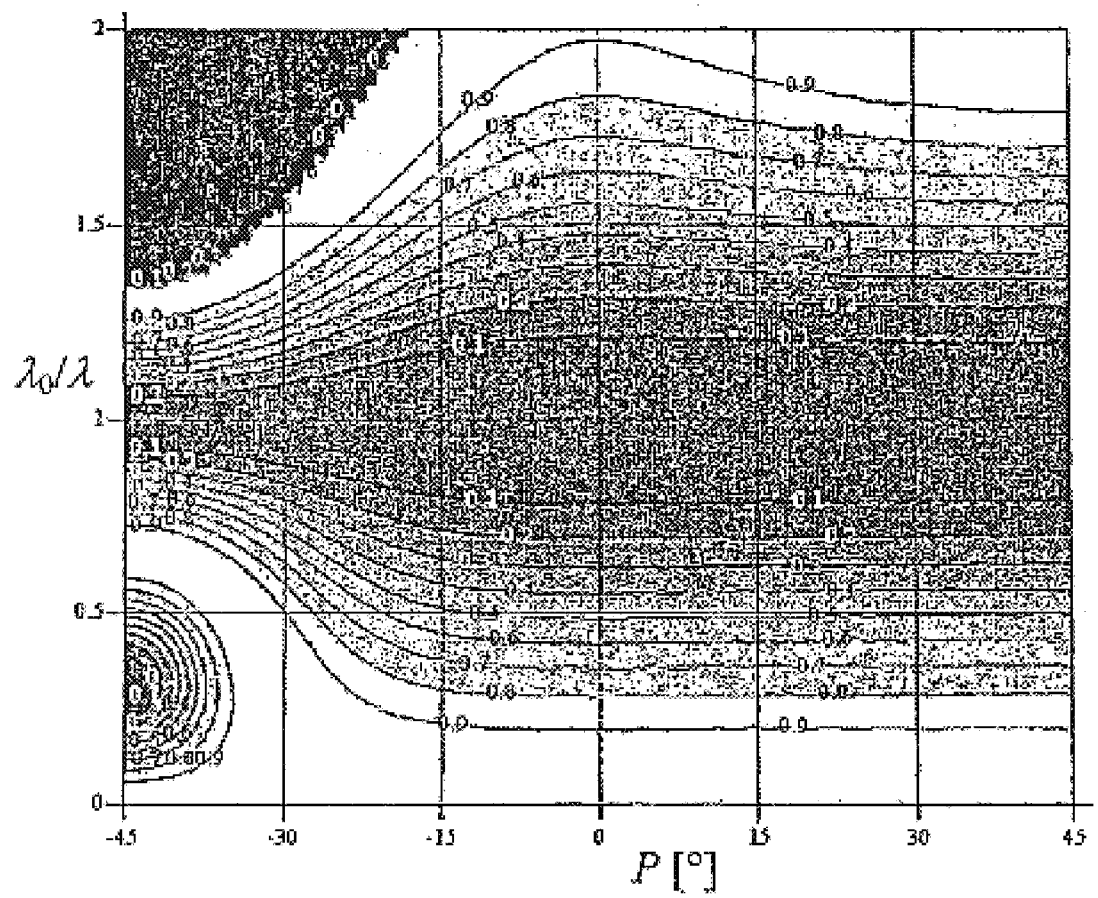
FIG. 7 shows the reflectivity R around the first branch calculated with fixed d, Δn, and Δφ, and variable $\lambda_0/\lambda$.

FIG. 7 shows reflectivity R around the first branch calculated at fixed $\underline{d}$, Δn, and $\Delta\phi$, for variable $\lambda_0/\lambda$. For P lying in the range $-10°$ to $+45°$ (or in the range 45° to 100° if $\Delta\phi<0$), the window corresponding to low reflectivity about the branch is broad and almost independent of P. This region corresponds to the black state of the display in white light having optimum optical quality (mean reflectivity that is low and that depends little on λ).

It can be seen that in this configuration, optimizing the black state does not require any particular orientation for the polarizer 10 except that $-10° \leq P \leq +100°$. It is therefore possible to make use of this freedom for selecting P, for given optical quality, to optimize the thickness $\underline{d}$ of the liquid crystal layer 30, with minimum thickness being good for improving switching.

In FIG. 5 it can be seen directly that this minimum thickness $d=\lambda/(4\Delta n)$ is obtained for $P=45°$ and that it varies slowly in the region $+15°<P<+75°$.

This thickness is half the optimum value for transmission [document 1] or reflection when using two polarizers.

The device in accordance with the present invention thus makes it possible with P close to 45° to reduce control voltages by a factor of 2 while maintaining good optical quality. Relaxation times after fields have been switched off are divided by 4 and can be reduced to millisecond order, which is compatible with high resolution video display.

For the "white" bistable state of the device, high reflectivity is required, and preferably R=1, with little dispersion in wavelength. These two conditions guarantee maximum brightness and good color for the white state. The only difference between the black state (already optimized) and the white state (still to be optimized) is an additional twist of ±180°.

Figure 8:
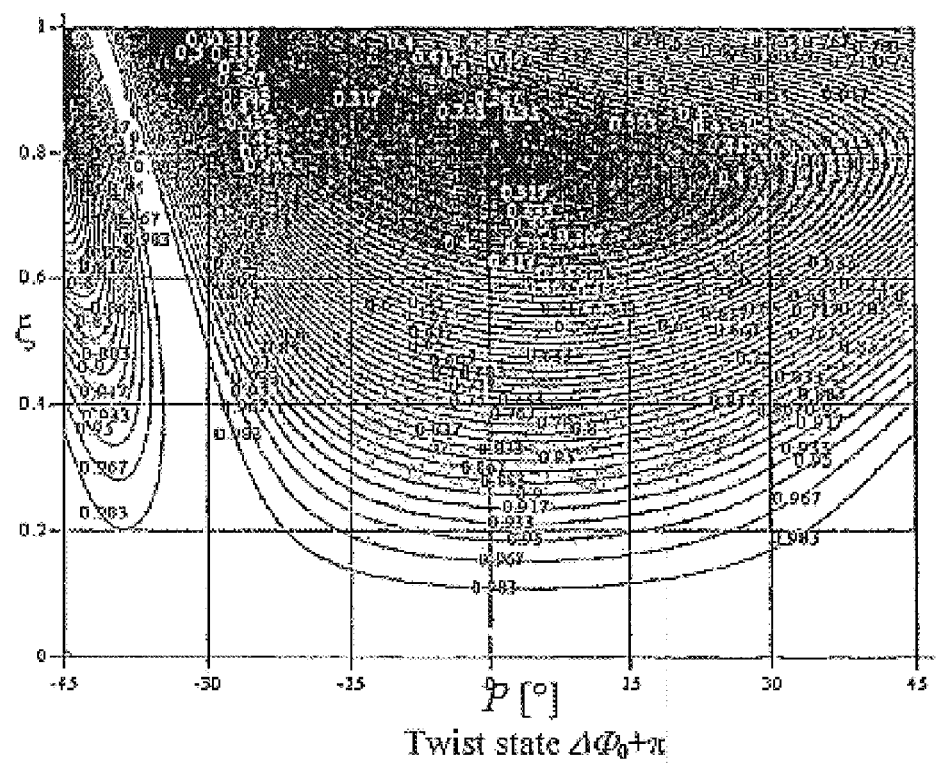
FIG. 8 shows the reflectivities $R(P,\lambda_0/\lambda)$ of "white" states for a given branch of the solution.
Figure 8:
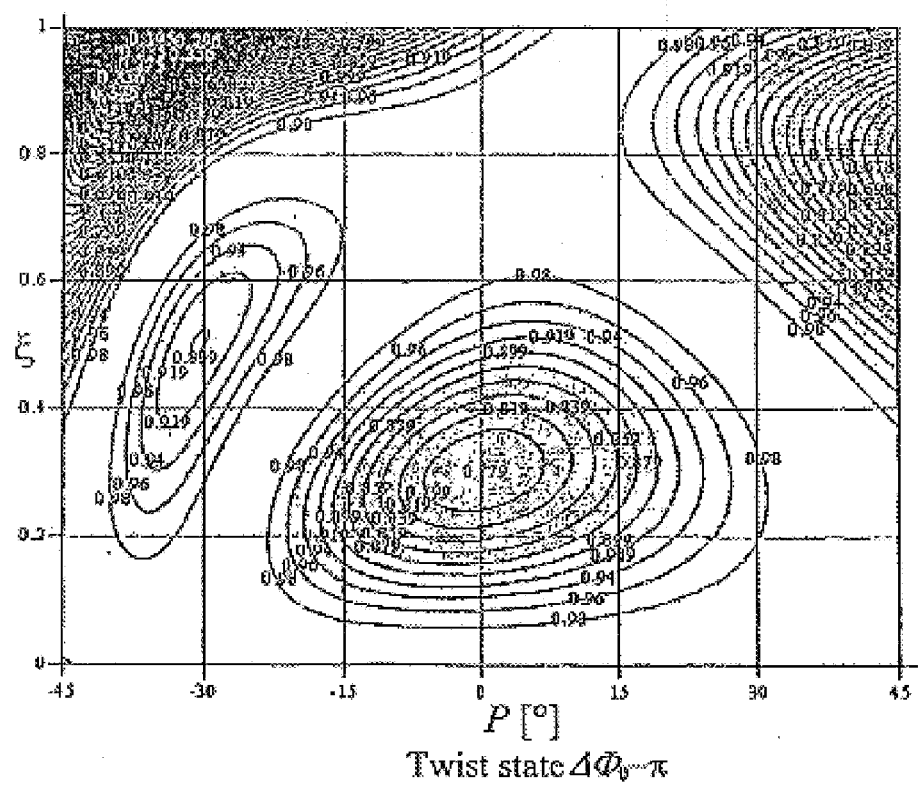

FIG. 8 shows reflectivities $R(P, \lambda_0/\lambda)$ of "white" states corresponding to the zero branch of the already optimized black state. It can be seen that under all circumstances R is very close to 1 and depends very little on $\lambda_0/\lambda$ in the range $+15°<P<+75°$.

This confirms the advantage of the optimum configuration for a bistable reflective display in accordance with the present invention when $P\approx\pm 45°$, $d\approx\lambda_0/4\cdot\Delta n$ (where $\lambda_0$ is selected to be close to the middle of the passband of the display), and $\Delta\phi\approx 0$ for the low-twist state. This configuration optimizes not only the optics of the two bistable states, but also makes it possible to use a liquid crystal layer 30 of minimum thickness, consequently improving switching between the two states.

Figure 9:
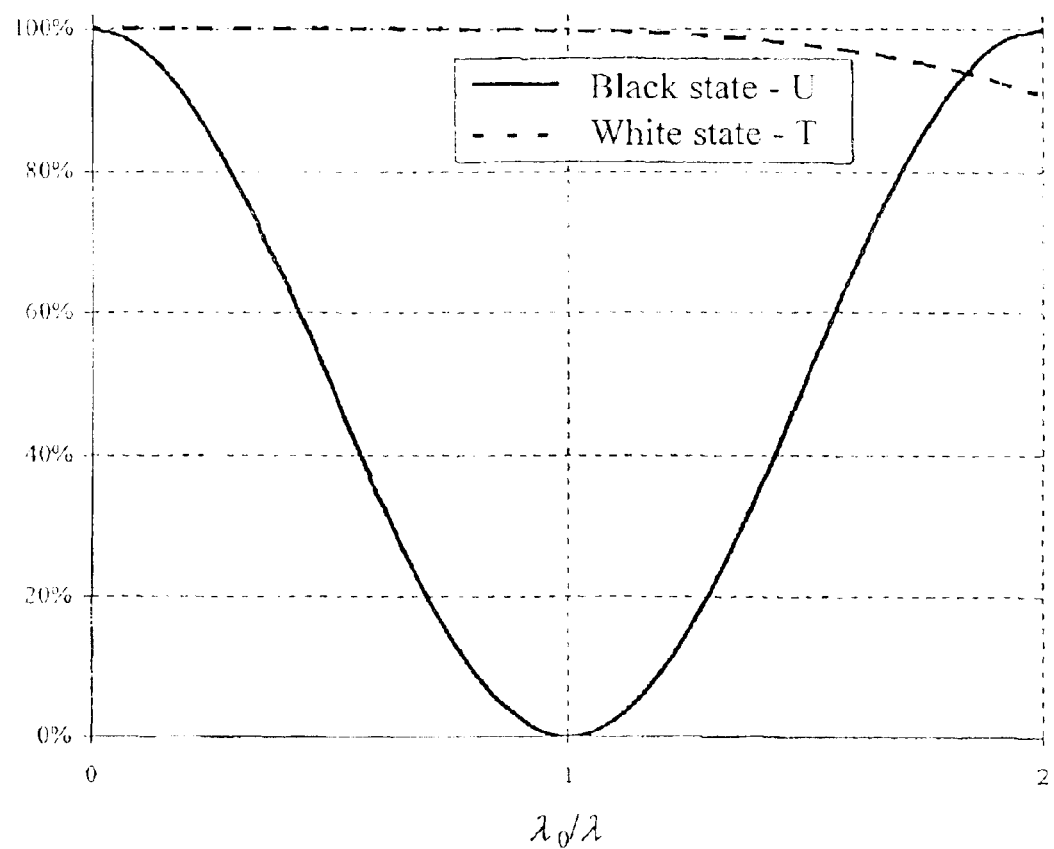
FIG. 9 shows the reflectivity of two states as a function of $\lambda/\lambda_0$ for an optimum configuration of the reflection device in accordance with the present invention.

FIG. 9 shows the reflectivity of the two states for $P=45°$ as a function of $\lambda/\lambda_0$ for the optimum configuration of the reflective device.

The reflectivity of the white state or T texture ($\Delta\phi=180°$) varies very slowly around $\lambda=\lambda_0$. In contrast, the black or U texture ($\Delta\phi=0°$) state has non-negligible dispersion $R(\lambda)$ which reduces contrast in white light and gives a black state that is colored.

Figure 10:
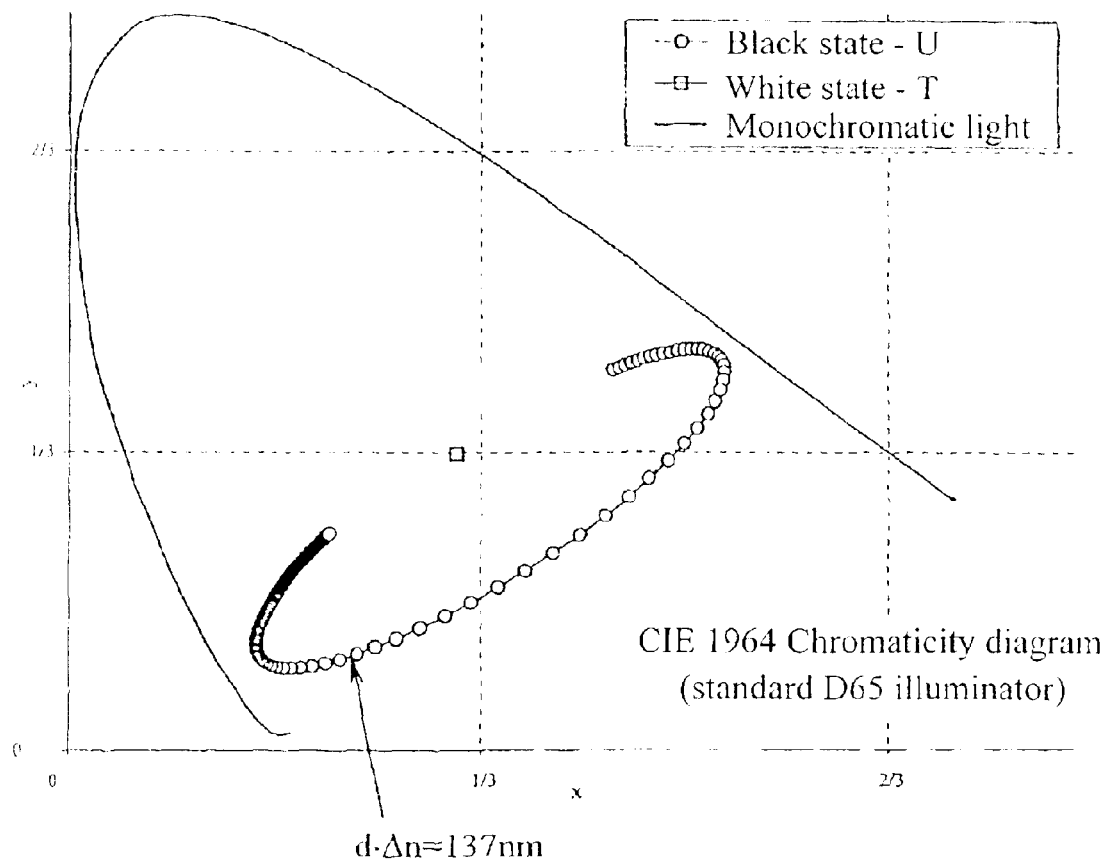
FIG. 10 shows colorimetry curves calculated for a standard D65 source as a function of d·Δn.

FIG. 10 shows colorimetry curves calculated for a D65 standard source as a function of $d\cdot\Delta n$. The pale state ($\Delta\phi=180°$) is very close to a perfect white, but the dark state ($\Delta\phi=0$) is colored.

Figure 11:
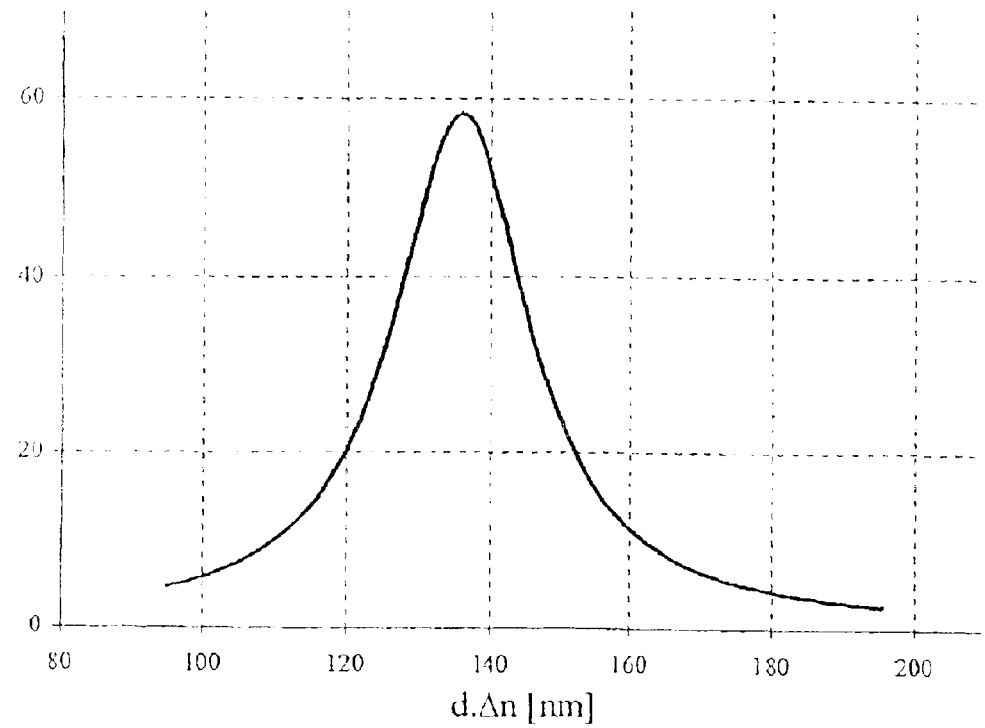
FIG. 11 shows the calculated contrast in white light.

The calculated contrast in white light (FIG. 11) is good ($\approx 57$) for $d\cdot\Delta n=137$ nm corresponding to a black state $\Delta\phi=0$ having a very dark blue color.

Figure 12:
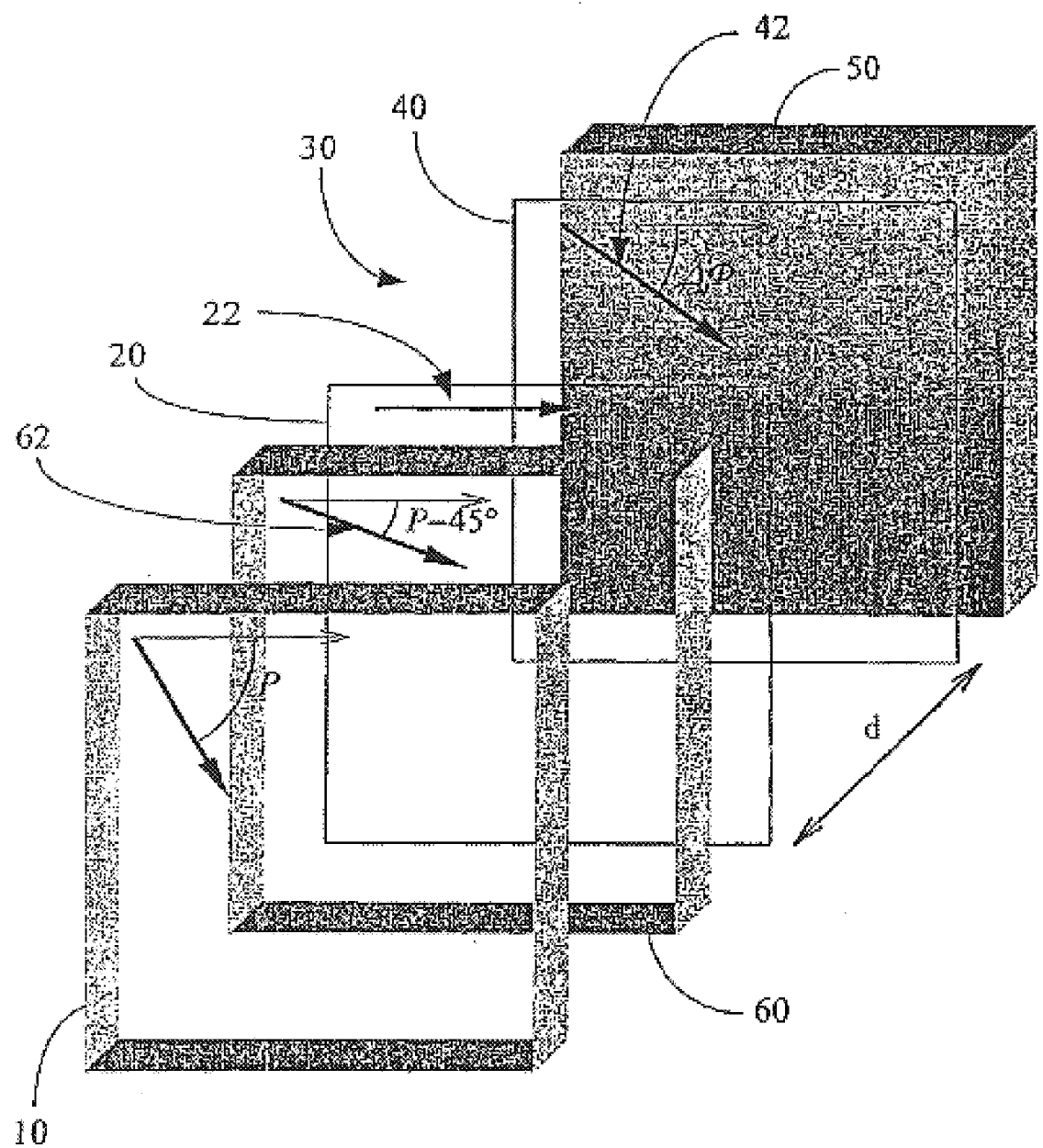
FIG. 12 is a diagrammatic perspective view of a device in accordance with the present invention incorporating an additional compensating plate.

In a variant as shown in FIG. 12, an additional improvement to the reflective bistable display proposed in the present invention comprises a compensating plate 60 of thin optical thickness which is inserted between the polarizer 10 and the reflector 50 either inside or outside the device. The optical axis 62 of this single axis compensating plate 60 is selected to be essentially at 45° relative to the polarizer 10.

The optical path length difference introduced by the compensator 60 for a single passage of light therethrough is $d_c\cdot\Delta n_c$, where $d_c$ is its thickness and $\Delta n_c$ is its birefringence (positive or negative). The corresponding angular phase shift is defined by $\delta_c=2\pi d_c\Delta n_c/\lambda_0$ where $\lambda_0$ is the wavelength of light in the center of the spectrum band for which the device is to be optimized.

Qualitatively, the role of the small phase shift compensating plate 60 is as follows. It is shown above that the optimum optical configuration for the device corresponds to an optical thickness in the U state that is close to $d\cdot\Delta n=\lambda_0/4$. However, for device switching, it is preferable to reduce the thickness $\underline{d}$ of the nematic 30 to as thin as possible. These two conditions can be satisfied simultaneously by replacing a fraction of the phase shift due to the liquid crystal 30 by a phase shift introduced by the compensating plate 60:

$$d'\cdot\Delta n + \delta_c = \lambda_0/4$$

where $d'<\lambda_0/(4\cdot\Delta n)$ is a smaller thickness. Under such circumstances, the black state will conserve its optical properties. The colorimetry and the brightness of the white state will be degraded slightly, but this undesirable effect can be compensated by optimizing the parameters P and $\Delta\phi$ if the phase shift $\delta_c=2\pi d_c\Delta n_c/\lambda_0$ is small (<<1 radian).

Figure 13:
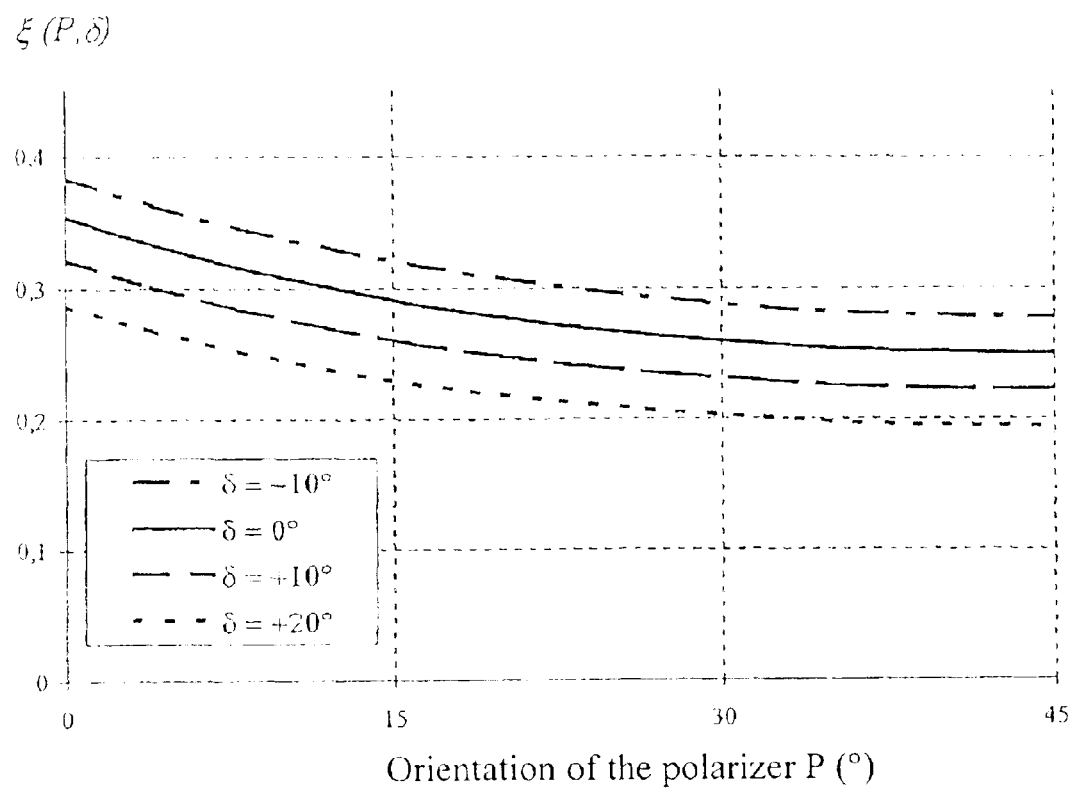
FIGS. 13 and 14 show different optimization solutions that are explained below.
Figure 14:
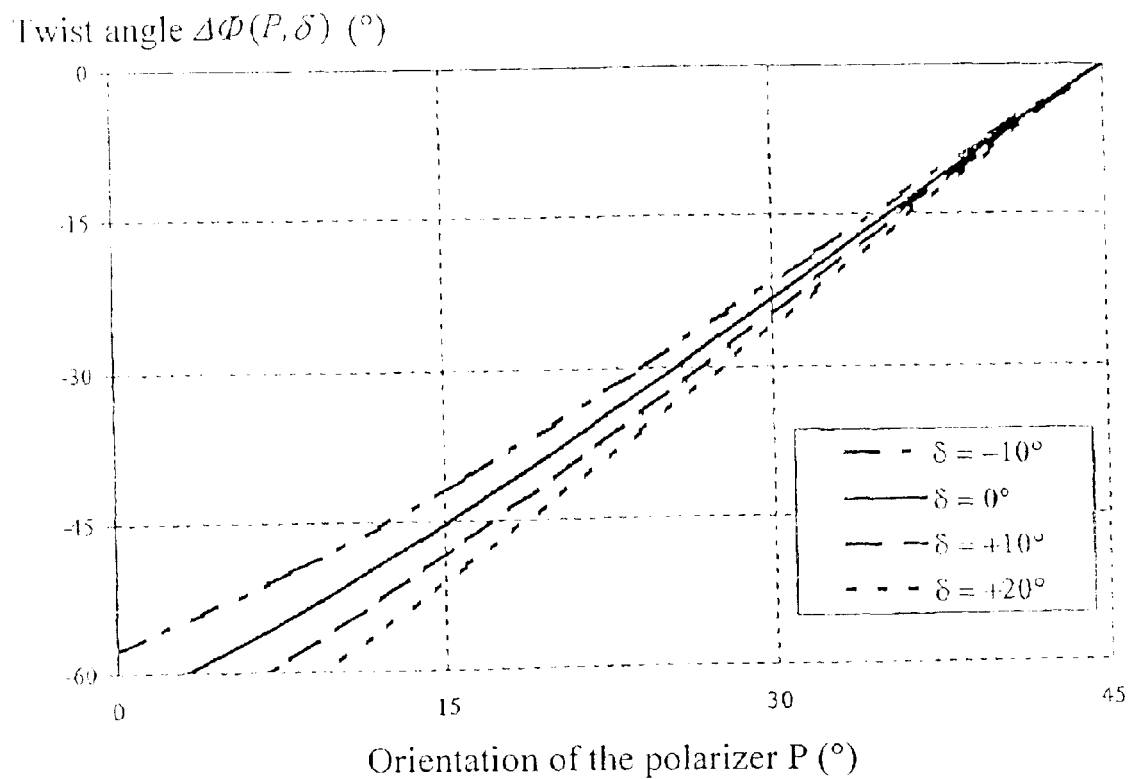

FIGS. 13 and 14 show the first branches of the solutions $\xi(P,\delta)$ and $\Delta\phi(P,\delta)$ calculated for $R(\Delta\phi)=0$ and for $\delta=-10°$, 0°, +10°, and +20°.

Figure 15:
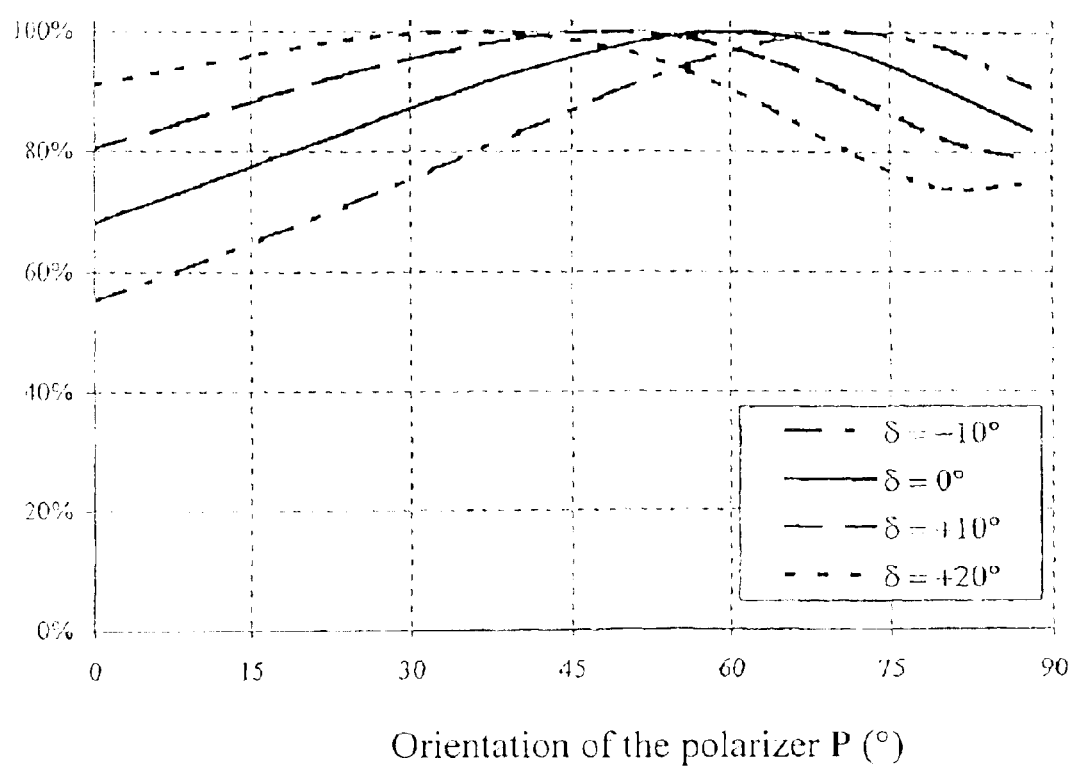
FIG. 15 shows the reflectivity of corresponding twisted states.

FIG. 15 shows the reflectivity of the corresponding twisted states $R(\Delta\phi-\pi)$ (with similar results being obtained for $\Delta\phi+\pi$).

From these figures, the person skilled in the art will understand that introducing a small quantity of phase shift ($\delta\approx 15°$) makes it possible to further reduce the thickness of the liquid crystal layer 30.

For a greater phase shift, the pale state $\Delta\phi\pm\pi$ becomes progressively less bright and more strongly colored, thereby reducing the optical quality of the display.

Figure 16:
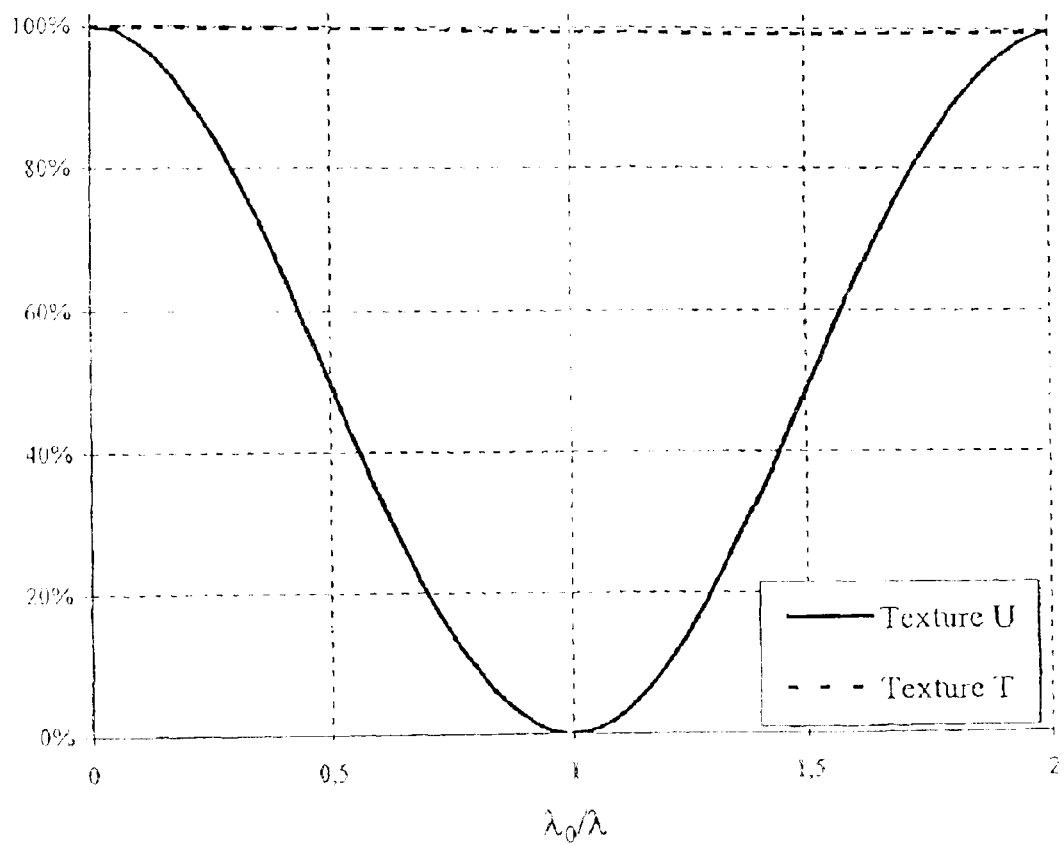
FIG. 16 shows the reflectivity of two states.

FIG. 16 shows the reflectivities of two states $\Delta\phi$ and $\Delta\phi-\pi$ calculated for $\Delta\phi=-25.4°$, $P=30°$, $\delta=15°$, $\lambda_0=560$ nm, $\xi(\lambda_0)=0.217$ as a function of $\lambda_0/\lambda$. This optimized configuration has optical quality comparable to the case without the compensator 60 ($\delta_0=0$), while nevertheless making it possible to use a liquid crystal layer 30 that is about 15% thinner.

In the above calculations, it is assumed that the dispersion $d\Delta n_c/d\lambda$ of the compensator 60 is similar to that $d\Delta n/d\lambda$ of the liquid crystal 30 itself. In practice, a suitable choice for the dispersion of the compensator 60 (e.g. of opposite sign) can give additional advantages, particularly smaller dispersion in the black state of the device, and thus better contrast in white light.

Particular Embodiment

A non-limiting embodiment of the device proposed in the present invention has been made and studied by the inventors. To demonstrate its advantages it has been compared with a bistable cell operating by breaking anchoring and optimized for display in transmission.

In both cases, the anchoring on one of the surfaces 20, 40 was strong with an angle of inclination of about 30° (grazing evaporation of SiO at 85°). On the other surface, weaker planar anchoring was imposed by evaporating SiO at 75°. The 5CB nematic that is commercially available from Merck was chiralized by adding the S 811 chiral dopant (from Merck). In both of the cells, the concentration used was adapted to obtain a spontaneous pitch for the mixture $P_0=4\cdot d$ (with $d=1.5$ μm for the transmission cell corresponding to the prior art and $d=0.85$ μm for the reflection cell in accordance with the present invention).

The static thresholds for breaking anchoring as measured on the weak anchoring plate in both cells were comparable ($E_c$=7 V/μm). Reproducible switching between the two bistable states U and T was performed using the same electrical signals for both devices, but with voltages that were very different: U=18 V for the state of the art transmission cell (d=1.5 μm) and U=8 V for the reflection cell proposed in the present invention (d=0.85 μm). The optical relaxation times after switching, as measured in the reflection cell in accordance with the present invention (τ=2 ms) were also much shorter than those in the transmission cell of the prior art (τ=6 ms). These results confirm the great practical advantage represented by the reflection configuration proposed in the present invention.

Naturally, the present invention is not limited to the embodiments described above, but extends to any variant within its spirit.

[1] FR-A-2 750 894.

[2] Appl. Phys. Lett. 51 (18) November 1987 "Optical properties of general twisted nematic liquid crystal displays", by H. L. Ong.

What is claimed is:

1. A reflective bistable display device, comprising:
    a) a liquid crystal material (30) contained between two parallel substrates (20, 40), the substrates being provided with electrodes on their facing inside surfaces in order to enable an electric field to be applied to said liquid crystal, at least the front substrate (20) and the front electrode being optically transparent;
    b) alignment layers or treatments on the electrodes to orient the liquid crystal and enable at least two alternative distinct textures that are stable or metastable in the absence of a field to be implemented, in which one of the textures is either non-twisted or twisted with a total angle lying in the range −90° to +90°, and the other texture presents additional twisting through an angle close to 180°;
    c) the thickness d of the liquid crystal layer (30) being selected in such a manner that the product d·Δn is close to $\lambda_0/4$, where $\lambda_0$ is the center wavelength of the working spectrum band of the display and Δn is the birefringence of the liquid crystal for said wavelength;
    d) means for applying electrical signals to the liquid crystal enabling it to switch between said distinct textures by breaking anchoring on at least one of the two substrates, and enabling the crystal to remain in either texture after the field has been removed;
    e) a polarizer (10) associated with the front face of the device, placed inside or outside it, and oriented at an angle lying in the range 15° to 75° relative to the direction of the liquid crystal on the front face of the device; and
    f) a specular or diffusing reflective element (50) placed at the rear face of the liquid crystal, inside or outside the device, enabling light to pass twice through the device and return towards an observer or towards additional optical elements;
    wherein the optical delay d·Δn of the liquid crystal (30) lies in the range $0.15\lambda_0$ to $0.35\lambda_0$.

2. A device according to claim 1, characterized by the fact that the liquid crystal material (30) comprises a liquid crystal or a liquid crystal mixture in a nematic phase.

3. A device according to claim 1, wherein the liquid crystal material (30) comprises a liquid crystal or a liquid crystal mixture in a cholesteric or nematic phase doped with a chiral substance in order to enable the energies of certain textures amongst the stable or metastable textures to be brought closer together or be equalized.

4. A device according to claim 1, wherein the polarizer (10) is a linear polarizer or an elliptical polarizer.

5. A device acorn to claim 1, wherein a compensating plate (60) is introduced on the optical path between the polarizer (10) and the reflector (50) inside or outside the device, providing an optical delay ΔI less than $\lambda_0/12$ where 2.0 is the center wavelength of the working spectrum band.

6. A device according to claim 5, wherein the optical axis (62) of the compensating plate (60) is oriented at substantially an angle of 45° relative to the polarizer (10).

7. A device according to claim 5, wherein the compensating plate (60) introduces an optical delay of less than 50 nm.

8. A device according to claim 5, wherein the polarizer (10) is combined with the compensating plate (60) in the form of a single element so as to constitute an electrical polarizer.

9. A device according to claim 1, wherein at least one of the electrodes contains a plurality of different segments enabling a plurality of independent pixels to be made on the same substrate and in the same device.

10. A device according to claim 9, wherein the independent pixels are provided with independent means for applying the field.

11. A device according to claim 9, wherein the independent pixels are organized in a multiplexed passive matrix.

12. A device according to claim 9, wherein the independent pixels are organized in a multiplexed active matrix.

13. A device according to claim 1, wherein the polarizer (10) is oriented at an angle close to 45° relative to the direction of the liquid crystal on the front face of the device.

14. A device according to claim 13, wherein the twist angle of the first texture is substantially equal to zero (ΔΦ≈0).

15. A device acorn to claim 1, wherein the twist angle ($\Delta\Phi_0$) of the texture in the low twist state, the relative twist (±180°) between the two states, the orientation (P) of the polarizer (10) relative to the alignment of the liquid crystal (30) on the front face (20), the thickness (d) of the liquid crystal material (30) placed between the two substrates (20, 40), and the birefringence (Δn) of the liquid crystal are optimized so as to obtain optimum optical performance, in particular in terms of contrast, brightness, and color.

16. A device according to claim 1, wherein the liquid crystal (30) introduces an optical delay lying in the range 100 nm to 180 nm.

17. A device according to claim 1, wherein the thickness of the liquid crystal material (30) is less than 6 μm.

18. A device according to claim 1, wherein the optical delay d·Δn of the liquid crystal lies in the range $0.20\lambda_0$ to $0.32\lambda_0$.

* * * * *

UNITED STATES PATENT AND TRADEMARK OFFICE
CERTIFICATE OF CORRECTION

PATENT NO. : 6,831,716 B2
DATED : December 14, 2004
INVENTOR(S) : Dozov et al.

It is certified that error appears in the above-identified patent and that said Letters Patent is hereby corrected as shown below:

<u>Title page,</u>
Item [54], Title, delete "REFLECTIVE BISTABLE DISPLAY DEVICE INCORPORATING A LIQUID CRYSTAL MATERIAL" and insert -- BISTABLE REFLECTION DISPLAY DEVICE --.

Signed and Sealed this

Eleventh Day of April, 2006

JON W. DUDAS
*Director of the United States Patent and Trademark Office*